(12) United States Patent
Zhang

(10) Patent No.: US 8,044,543 B2
(45) Date of Patent: Oct. 25, 2011

(54) STATOR AND WIRE WINDING METHOD THEREFOR

(75) Inventor: Xu Zhang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 71 days.

(21) Appl. No.: 12/502,329

(22) Filed: Jul. 14, 2009

(65) Prior Publication Data

US 2010/0148618 A1    Jun. 17, 2010

(30) Foreign Application Priority Data

Dec. 12, 2008    (CN) .......................... 2008 1 0220113

(51) Int. Cl.
*H02K 11/00* (2006.01)
*H02K 3/00* (2006.01)

(52) U.S. Cl. .......................... 310/71; 310/194; 310/195

(58) Field of Classification Search ................... 310/71, 310/195, 194, 58–63
See application file for complete search history.

(56) References Cited

U.S. PATENT DOCUMENTS

| 7,777,386 B2 * | 8/2010 | Horst ..................... 310/216.004 |
| 2005/0242677 A1 * | 11/2005 | Akutsu et al. ................. 310/179 |
| 2008/0122300 A1 * | 5/2008 | Cho et al. ........................ 310/43 |

* cited by examiner

*Primary Examiner* — Quyen Leung
*Assistant Examiner* — Leda Pham
(74) *Attorney, Agent, or Firm* — Matthias Scholl P.C.; Matthias Scholl

(57) ABSTRACT

A stator, with a stator core, a plurality of windings with a plurality of in-phase windings and anti-phase windings, a plurality of slots, an insulating plate, a plurality of cylinders, and a plurality of teeth. The teeth protrude from the stator core. The winding is received in the slot and wraps around the tooth. The insulating plate is disposed on the surface of the stator core. The cylinders are disposed on the insulating plate. A transition line is disposed between two adjacent teeth and hangs on the cylinder. A plurality of supporting mechanisms is disposed on the cylinders.

21 Claims, 4 Drawing Sheets

STATOR AND WIRE WINDING METHOD THEREFOR

CROSS-REFERENCE TO RELATED APPLICATIONS

Pursuant to 35 U.S.C. §119 and the Paris Convention Treaty, this application claims priority benefits to Chinese Patent Application No. 200810220113.7 filed on Dec. 12, 2008, the contents of which are incorporated herein by reference.

BACKGROUND OF THE INVENTION

1. Field of the Invention

The invention relates to a stator and a wire winding method therefor.

2. Description of the Related Art

Conventional stators comprise a stator core, an insulating plate, and a plurality of windings. The stator core comprises a plurality of teeth and slots formed between adjacent teeth.

A conventional method for winding a stator comprises setting a plurality of connecting portions inbetween adjacent teeth and wrapping and passing transition wires around and through the connecting portions. However, problems with the method are that transition lines often intersect each other in the case of a three-phase winding, which makes assembly difficult, often causes transition wires to break, and reduces reliability of insulation between phases.

SUMMARY OF THE INVENTION

In view of the above-described problems, it is one objective of the invention to provide a stator having a winding that features non-intersecting transition lines, and thus high insulation reliability, a simple structure, and convenient winding.

It is another objective of the invention to provide a wire winding method that features non-intersecting transition lines, and thus high insulation reliability, a simple structure, and convenient winding.

To achieve the above objectives, in accordance with one embodiment of the invention, provided is a stator, comprising a stator core, a plurality of windings, said windings comprising a plurality of in-phase windings and anti-phase windings, a plurality of slots, an insulating plate, a plurality of cylinders, and a plurality of teeth, wherein the teeth protrude from the stator core, the winding is received in the slot and wraps around the tooth, the insulating plate is disposed on the surface of the stator core, the cylinders are disposed on the insulating plate, a transition line is disposed between two adjacent teeth and hangs on the cylinder, and a plurality of supporting mechanisms are disposed on the cylinders.

In a class of this embodiment, the cross-section of the cylinder is circular, runway-shaped, semi-circular, or trapezoidal.

In a class of this embodiment, the number of the cylinders is twice that of the slots.

In a class of this embodiment, the windings are enameled copper coils.

In a class of this embodiment, the windings are enameled aluminum coils.

In a class of this embodiment, the supporting mechanism comprises a plurality of protruding portions.

In a class of this embodiment, the protruding portion is disposed between adjacent cylinders.

In a class of this embodiment, the transition line is supported by the top of the protruding portion.

In a class of this embodiment, the protruding portions have different heights so that the transition lines of the anti-phase windings do not intersect each other.

In a class of this embodiment, the cylinder is higher than the protruding portion.

In a class of this embodiment, the protruding portion is plate-shaped.

In another aspect of the invention, provided is a wire winding method, comprising providing a stator comprising a stator core, a plurality of windings comprising a plurality of in-phase windings and anti-phase windings, a plurality of slots, an insulating plate, a plurality of cylinders, and a plurality of teeth, the teeth protruding from the stator core, the winding being received in the slot and wraps around the tooth, the insulating plate being disposed on the surface of the stator core, and the cylinders being disposed on the insulating plate, and a plurality of protruding portions being disposed between adjacent cylinders and having different heights; providing a plurality of transition lines between two adjacent teeth; and hanging the transition lines on the cylinders and supporting the transition lines by the top of the protruding portions.

Advantages of the stator of the invention comprise:
1) no intersections between transition lines;
2) high insulation reliability;
3) regular arrangement of transition lines; and
4) rapid and convenient winding.

In another embodiment of the invention, provided a wire winding method for the stator, the method comprising a) hanging transition lines of windings from one tooth to another on the cylinder of an insulating plate, and b) disposing a plurality of protruding portions having various heights between the cylinders.

Using the wire winding method of the invention, transition lines of different phase winding do not intersect with each other, and thus insulation reliability is ensured. Furthermore, the transition lines are disposed on one side of the stator, and thus fast and convenient winding is implemented.

BRIEF DESCRIPTION OF THE DRAWINGS

The invention is described hereinbelow with reference to accompanying drawings, in which.

DETAILED DESCRIPTION OF THE EMBODIMENTS

Figure 1:
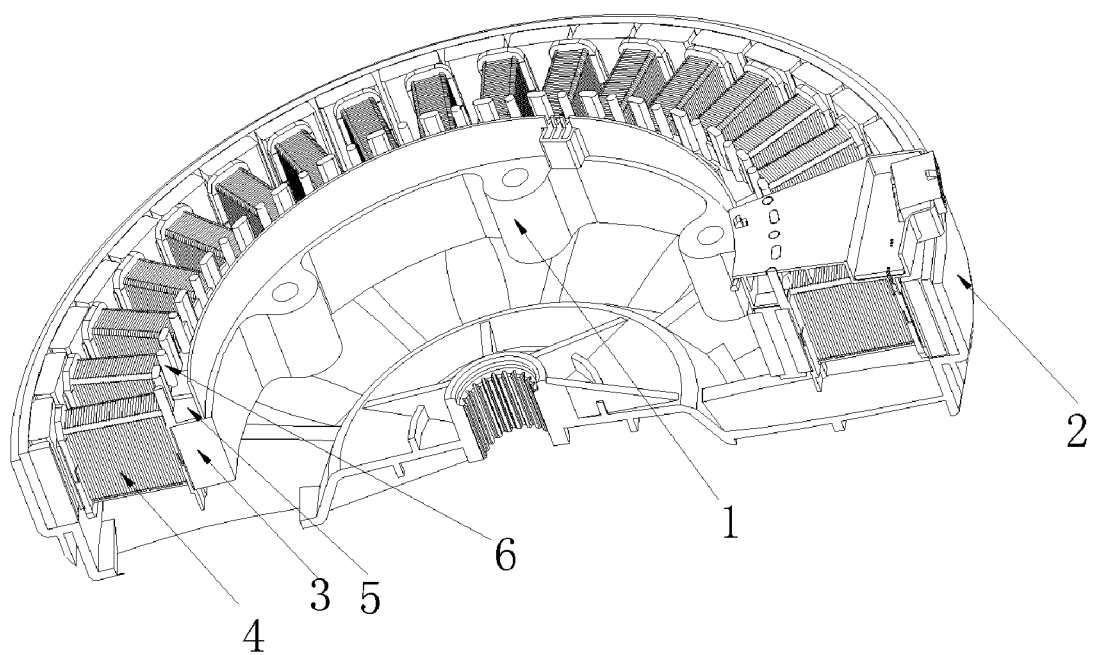
FIG. 1 is a cross-sectional view of a motor comprising a stator of one embodiment of the invention.

As shown in FIG. 1, a motor comprises a stator 1 and a rotor 2.

Figure 2:
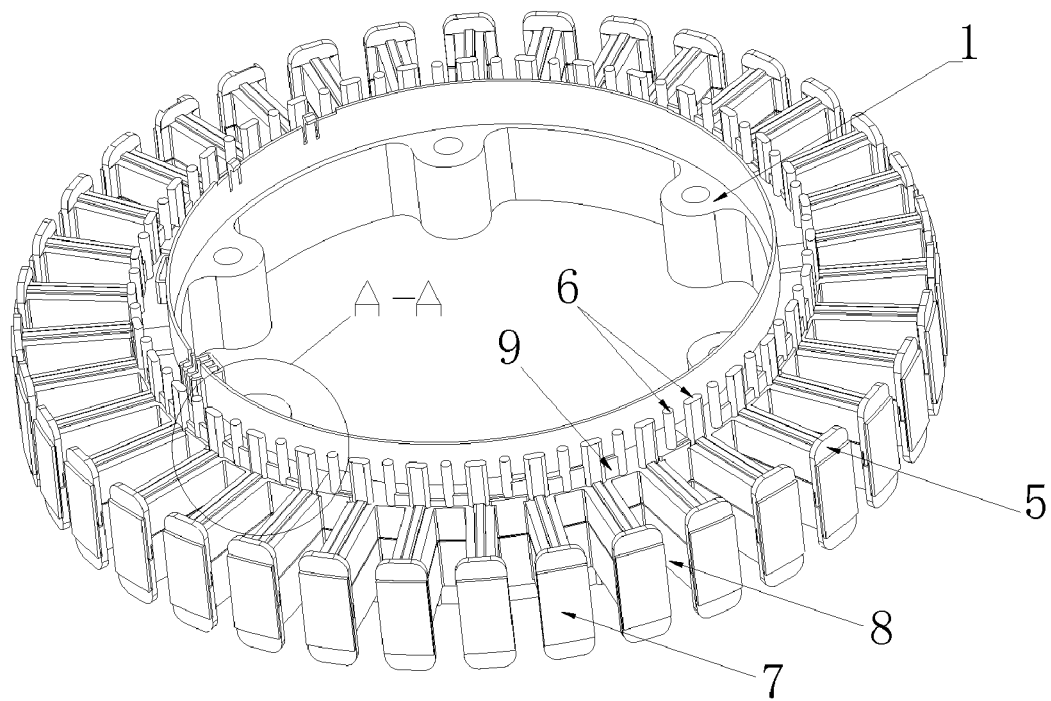
FIG. 2 is a schematic diagram of a stator of one embodiment of the invention.
Figure 3:
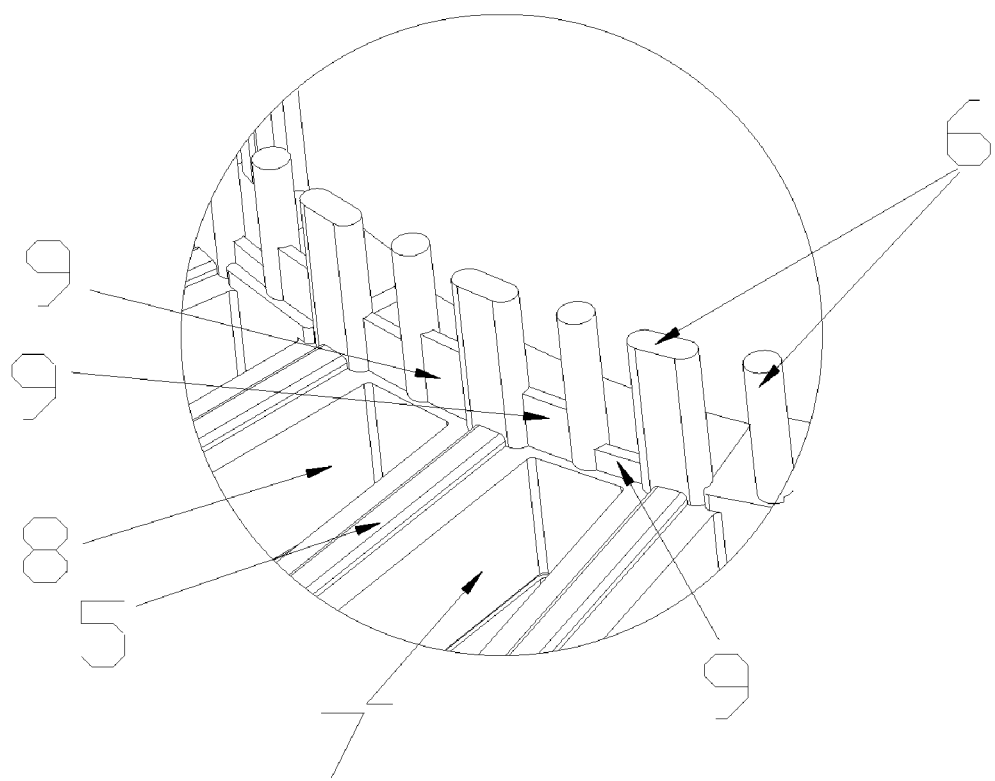
FIG. 3 is an enlarged view taken from line A-A in FIG. 2.

As shown in FIGS. 2 and 3, the stator 1 comprises a stator core 3, a plurality of windings 4 comprising a plurality of in-phase windings and anti-phase windings, a plurality of slots 8, an insulating plate 5, a plurality of cylinders 6, and a plurality of teeth 7.

The teeth 7 protrude from the stator core.

The winding 4 is received in the slot 8 and wraps around the tooth 7.

The insulating plate 5 is disposed on the surface of the stator core 3.

The cylinders 6 are disposed on the insulating plate 5.

A transition line is disposed between two adjacent teeth 6 and hangs on the cylinder 6.

A plurality of supporting mechanisms is disposed on the cylinders 6.

The supporting mechanism comprises a plurality of protruding portions 9 disposed between adjacent cylinders 6. The transition line is supported by the top of the protruding portion 9. The protruding portions 9 have different heights so that the transition lines of the anti-phase windings do not intersect each other. The cylinder 6 is higher than the protruding portion 9. In this embodiment, the protruding portion 9 is plate-shaped.

The cross-section of the cylinder 6 is circular, runway-shaped, semi-circular, or trapezoidal.

The number of the cylinders 6 is twice than that of the slots 8.

The windings 4 are enameled copper coils or enameled aluminum coils.

Figure 4:
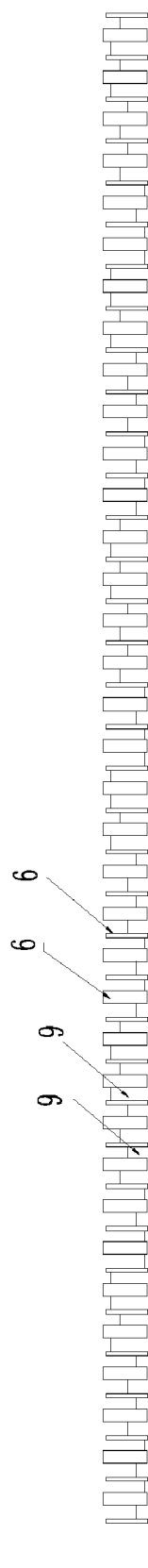
FIG. 4 illustrates cylinder and protruding portions of one embodiment of the invention.
Figure 5:
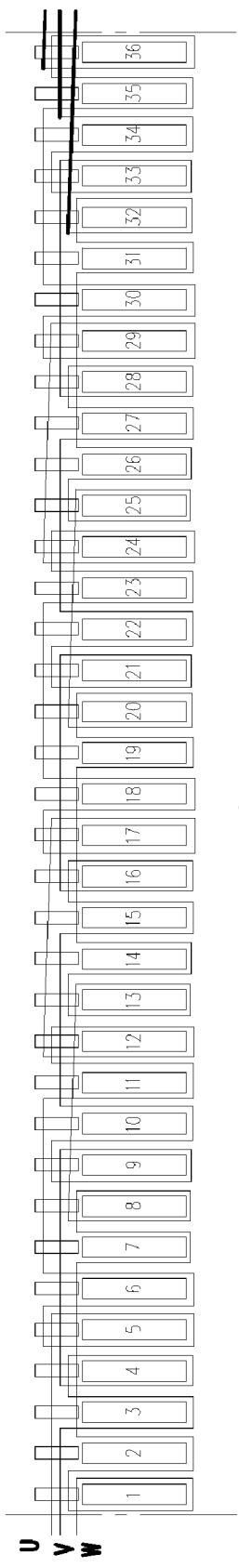
FIG. 5 is illustrates a wire winding method of one embodiment of the invention.

As shown in FIGS. 4 and 5, when 36 teeth 7 are unfolded, the transition lines of three phase winding U, V and W do not intersect each other.

A wire winding method of the invention comprises a) providing a stator comprising a stator core 3, a plurality of windings 4 comprising a plurality of in-phase windings and anti-phase windings, a plurality of slots 8, an insulating plate 5, a plurality of cylinders 6, and a plurality of teeth 7, the teeth 7 protruding from the stator core 3, the winding 4 being received in the slot 8 and wrapping around the tooth 7, the insulating plate 5 being disposed on the surface of the stator core 3, and the cylinders 6 being disposed on the insulating plate 5, and a plurality of protruding portions 9 being disposed between adjacent cylinders 6 and having different heights, b) providing a plurality of transition lines between two adjacent teeth 7, and c) hanging the transition lines on the cylinders 6 and supporting the transition lines by the top of the protruding portions 9.

Using the wire winding method of the invention, transition lines of different phase winding do not intersect each other, and thus insulation reliability is ensured. Furthermore, the transition lines are disposed on one side of the stator, and thus fast and convenient winding is implemented.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claim.

The invention claimed is:

1. A stator, comprising a stator core;
a plurality of windings comprising a plurality of in-phase windings and anti-phase windings and comprising transition lines;
an insulating plate;
a plurality of cylinders;
a plurality of teeth; and
a plurality of protruding portions having heights; wherein
said teeth protrude from said stator core;
said windings are wrapped around said plurality of teeth;
said insulating plate is disposed on the surface of said stator core;
said cylinders are disposed on said insulating plate;
said transition lines are disposed between said teeth and hang on said cylinders;
said plurality of protruding portions is disposed each between two adjacent said cylinders,
said plurality of protruding portions supports said transition lines; and
said heights of said plurality of protruding portions are different from one another whereby said transition lines do not intersect.

2. The stator of claim 1, wherein the cross-section of said cylinder is circular, runway-shaped, semi-circular, or trapezoidal.

3. The stator of claim 1, wherein the number of said cylinders is twice that of said plurality of teeth.

4. The stator of claim 1, wherein said windings are enameled copper coils.

5. The stator of claim 1, wherein said windings are enameled aluminum coils.

6. The stator of claim 1, wherein transition lines of said anti-phase windings do not intersect each other.

7. The stator of claim 1, wherein said cylinder is higher than said protruding portion.

8. The stator of claim 1, wherein said protruding portion is plate-shaped.

9. A wire winding method for winding the stator of claim 1, comprising
providing a stator comprising a stator core, a plurality of windings comprising a plurality of in-phase windings and anti-phase windings and comprising transition lines, an insulating plate, a plurality of cylinders, and a plurality of teeth, said teeth protruding from said stator core, said winding being wrapped around said plurality of teeth, said insulating plate being disposed on the surface of said stator core; and said cylinders being disposed on said insulating plate, and a plurality of protruding portions being disposed each between two adjacent cylinders and having different heights;
providing said transition lines between said teeth; and
hanging said transition lines on said cylinders and supporting said transition lines by said protruding portions, and preventing said transition lines from intersecting one another by employing said protruding portions having said different heights.

10. A stator, comprising
a stator core;
an insulating plate on a surface of said stator core;
a plurality of teeth protruding from said stator core;
a plurality of cylinders disposed on said insulating plate;
a plurality of protruding portions having heights and each being disposed between two adjacent cylinders of said plurality of cylinders; and
a plurality of windings wrapped around said plurality of teeth, said plurality of windings comprising transition lines disposed between said plurality of teeth; wherein
said plurality of protruding portions supports said transition lines;
said transition lines hang on said plurality of cylinders; and
said heights of said plurality of protruding portions are different from one another whereby said transition lines do not intersect.

11. The stator of claim 10, wherein the cross-section of said plurality of cylinders is circular, runway-shaped, semi-circular, or trapezoidal.

12. The stator of claim 10, wherein the number of said plurality of cylinders is twice of that of said plurality of teeth.

13. The stator of claim 10, wherein said plurality of windings uses enameled copper coils.

14. The stator of claim 10, wherein said plurality of windings uses enameled aluminum coils.

15. The stator of claim 10, wherein said plurality of windings comprises in-phase windings and anti-phase windings, and transition lines of said anti-phase windings do not intersect.

16. The stator of claim 10, wherein said plurality of cylinders is higher than said plurality of protruding portions.

17. The stator of claim 10, wherein said plurality of protruding portions is plate-shaped.

18. The stator of claim 1, wherein said cylinders directly protrude from said insulating plate.

19. The stator of claim 1, wherein said protruding portions are plate-shaped.

20. The stator of claim 19, wherein a top of each of said protruding portions forms a leveled plane.

21. The stator of claim 20, whereby heights of the transition lines are constant at different positions of said protruding portions.

* * * * *